United States Patent [19]
Yamanashi et al.

[11] Patent Number: 4,477,368
[45] Date of Patent: Oct. 16, 1984

[54] COLOR DISPLAY LIQUID CRYSTAL COMPOSITION

[75] Inventors: Fumiaki Yamanashi; Yuzo Hayashi, both of Iwaki; Mitsuru Kano, Furukawa; Yoshiyuki Fujiwara, Iwaki; Yoshizo Tashiro, Furukawa, all of Japan

[73] Assignee: Alps Electric Co., Ltd., Japan

[21] Appl. No.: 431,326

[22] Filed: Sep. 30, 1982

[30] Foreign Application Priority Data

Oct. 1, 1981 [JP] Japan ................................ 56-156831

[51] Int. Cl.$^3$ ............................ C09K 3/34; G02F 1/13
[52] U.S. Cl. ................................. 252/299.1; 350/349; 350/346
[58] Field of Search ...................... 252/299.1; 350/349, 350/346

[56] References Cited

U.S. PATENT DOCUMENTS

| 4,145,114 | 3/1979 | Coates et al. | 252/299.1 |
| 4,273,929 | 6/1981 | Boller et al. | 252/299.1 |
| 4,395,350 | 7/1983 | Boller et al. | 252/299.63 |

FOREIGN PATENT DOCUMENTS

| 55-127485 | 10/1980 | Japan | 252/299.1 |
| 56-57850 | 5/1981 | Japan | 252/299.1 |

OTHER PUBLICATIONS

Seki, H., et al., Jpn. J. Appl. Phys., vol. 21, No. 1, pp. 191–192, (1982).
Seki, H., et al., Jpn. J. Appl. Phys., vol. 19, No. 8, pp. L501–L503, (1980).
Seki, H., et al., "Light–Stability of Guest–Host Cells", Abst. L–1P, Abstracts of the 8th Intern'l L.C. Conf., (1980).
Bloom, A., et al., Mol. Cryst. Liq. Cryst., vol. 40, pp. 213–221, (1977).
Bloom, A., et al., Mol. Cryst. Liq. Cryst., vol. 41(Lett.), pp. 1–4, (1977).
Cox, R. J., Mol. Cryst. Liq. Cryst., vol. 55, pp. 1–32, (1979).
Cognaro, J., et al., Mol. Cryst. Liq. Cryst., vol. 68, pp. 207–229, (1981).

Primary Examiner—Teddy S. Gron
Attorney, Agent, or Firm—Guy W. Shoup; Henry T. Burke

[57] ABSTRACT

A color display liquid crystal composition comprising a nematic liquid crystal having positive dielectric anisotropy, an optically active substance and a dichroic dye mixture consisting of a dichroic reddish purple diazo dye (1,4-naphthylene derivative) and a dichroic red diazo dye (1,4-phenylene derivative). This composition is suitable for use in a guest-host type color liquid crystal display device.

5 Claims, No Drawings

COLOR DISPLAY LIQUID CRYSTAL COMPOSITION

The present invention relates to a color display liquid crystal mixture suitable for use in a phase transition type guest-host color liquid crystal display device.

Recently, in guest-host color liquid crystal display devices, a White-Taylor phase transition type color liquid crystal display device has attracted attention, since it can be operated with a low voltage and a high contrast display can be obtained without using any polarizing plate. A liquid crystal composition used in the phase transition type guest-host color liquid crystal display device comprises a nematic liquid crystal (main component), an optically active substance such as cholesteric liquid crystal or chiral nematic liquid crystal and a dichroic dye. The display contrast of this display device depends greatly on the refractive index anisotropy, cholesteric pitch of the optically active substance, order parameter of the dichroic dye, and the like. The influence of the order parameter of the dichroic dye on the display contrast is particularly significant. It is important, therefore, suitably to select a combination of the dichroic dye with the liquid crystal such as nematic liquid crystal or cholesteric liquid crystal. Further, from the viewpoint of the display quality, color tone and performance stability, it is important to select a suitable dichroic dye.

As dichroic dyes contained in these liquid crystal mixtures, there have been used oil-soluble dyes, particularly polyazo dyes, thiazole dyes and anthraquinone dyes having a relatively long and narrow molecular form. However, they have been unsatisfactory with respect to the performance stability and color tone.

An object of the present invention is to provide a dichroic dye suitable for use in a phase transition type negative color liquid crystal display device and to provide a display device having excellent performance stability, color tone and display contrast.

The present invention is characterized in that a mixture of a 1,4-naphthylene derivative (reddish purple dye) and a 1,4-phenylene derivative (red dye) is used as a red dye for a phase transition type negative color liquid crystal display device.

After investigations of various red dyes, the inventors have found that a negative display having excellent color tone, contrast and performance stability can be obtained by using a mixture of the above-mentioned two derivatives as a dichroic dye.

The 1,4-naphthylene derivative used has the structural formula:

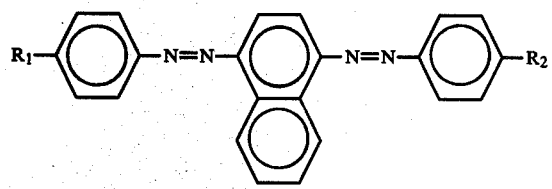

wherein $R_1$ represents an alkyl group having up to 5 carbon atoms and $R_2$ represents

or

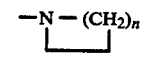

in which R and R' each represent a lower alkyl group and n represents an integer of at least 4.

The 1,4-phenylene derivative has the structural formula:

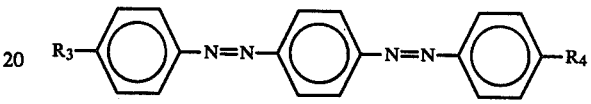

wherein $R_3$ represents an alkyl group having up to 5 carbon atoms and $R_4$ represents

or

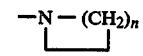

in which R'' and R''' each represent a lower alkyl group and n represents an integer of at least 4.

If the amount of the 1,4-naphthylene derivative is excessive, the display color becomes purplish, while if the amount of the 1,4-phenylene derivatives is excessive, the color becomes orangy or yellowish. To obtain a suitable red display, it is preferred to use a mixture of 60–95 wt.% of the 1,4-naphthylene derivative and 40–5 wt.% of the 1,4-phenylene derivative as the dichroic dye. The following examples will further illustrate the present invention.

EXAMPLE 1

A transparent indium oxide electrode of a given shape was formed on a glass board, coated with an oriented liquid crystal layer of silicon oxide, and then subjected to the rubbing treatment, to obtain a liquid crystal cell board. Two liquid crystal cell boards were prepared in this manner, with the direction of rubbing opposite to each other. The two liquid crystal cell boards were put together at an interval (gap) of 10 μm to obtain a liquid crystal cell. A color liquid crystal mixture described below was poured and sealed in the gap to obtain a liquid crystal display device. The liquid crystal mixture had the following composition:

| | |
|---|---|
| Nematic liquid crystal (Biphenyl room temperature liquid crystal) (GR-41; a product of Chisso Co.) | 98.75 wt. % |
| Optically active substance (Cholesteryl nonanoate) | 0.8 wt. % |
| Dichroic dye | 0.45 wt. % |

-continued 1,4-Naphthylene derivative 0.32 wt. %

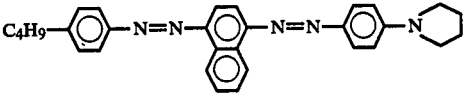

1,4-Phenylene derivative 0.13 wt. %

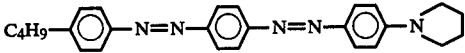

The color liquid crystal display device prepared as above exhibited excellent negative display with and applied voltage of 5 V (32 Hz, square wave) at room temperature. Both display contrast and clarity were excellent and the performance was stable.

EXAMPLE 2

A color liquid crystal display device was prepared in the same manner as in Example 1 except that a dichroic dye mixture of compounds of the following structural formulae was used:

| | |
|---|---|
| Nematic liquid crystal | 98.65 wt. % |
| Optically active substance | 0.8 wt. % |
| Dichroic dye | 0.55 wt. % |
| 1,4-Naphthylene derivative: | 0.44 wt. % |

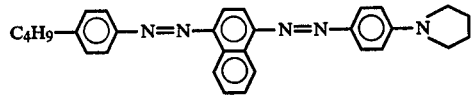

1,4-Phenylene derivative: 0.11 wt. %

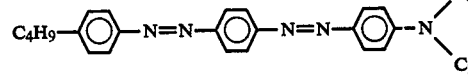

The resulting color liquid crystal display device exhibited clear red color and had excellent display contrast, display quality and stable performance.

EXAMPLES 3-8

Color liquid crystal display devices were prepared using 0.8 wt.% of the optically active substance (cholesteryl nonanoate) and various amounts of the dichroic dyes in the same manner as in Example 1.

EXAMPLE 3

| | |
|---|---|
| Dichroic dye | 0.60 wt. % |
| 1,4-Naphthylene derivative: | 0.48 wt. % |

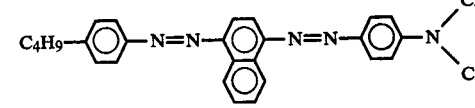

1,4-Phenylene derivative: 0.12 wt. %

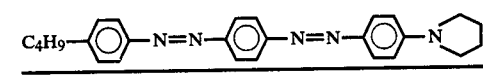

The resulting color liquid crystal display device was capable of making a clear negative display having excellent contrast and performance stability.

EXAMPLE 4

| | |
|---|---|
| Dichroic dye | 0.58 wt. % |
| 1,4-Naphthylene derivative: | 0.5 wt. % |

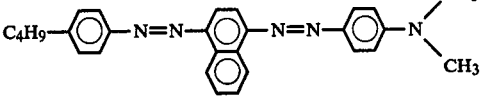

1,4-Phenylene derivative: 0.08 wt. %

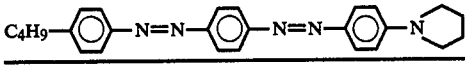

The resulting color liquid crystal display device was capable of making a clear negative display having excellent contrast and performance stability.

EXAMPLE 5

| | |
|---|---|
| Dichroic dye | 0.8 wt. % |
| 1,4-Naphthylene derivative: | 0.7 wt. % |

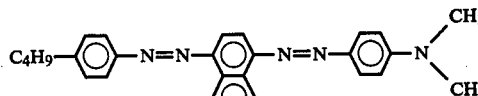

1,4-Phenylene derivative: 0.1 wt. %

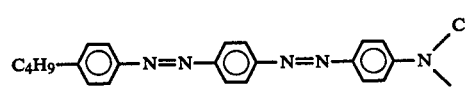

The resulting color liquid crystal display device was capable of making a clear negative display having excellent contrast and performance stability.

EXAMPLE 6

| | |
|---|---|
| Dichroic dye | 0.6 wt. % |
| 1,4-Naphthylene derivative: | 0.54 wt. % |

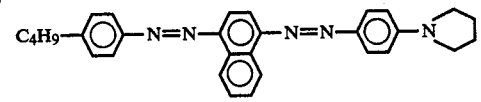

1,4-Phenylene derivative: 0.06 wt. %

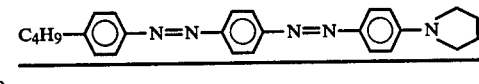

The resulting color liquid crystal display device was capable of making a clear negative display having excellent contrast and performance stability.

EXAMPLE 7

| | |
|---|---|
| Dichroic dye | 0.80 wt. % |
| 1,4-Naphthylene derivative: | 0.72 wt. % |

-continued

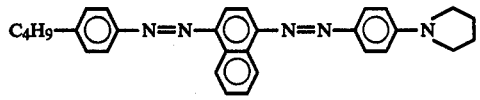

| 1,4-Phenylene derivative: | 0.08 wt. % |

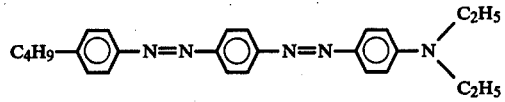

The resulting color liquid crystal display device exhibited clear red color and had excellent display contrast and display quality and stable performance.

EXAMPLE 8

| Dichroic dye | 0.65 wt. % |
| 1,4-Naphtylene derivative: | 0.55 wt. % |

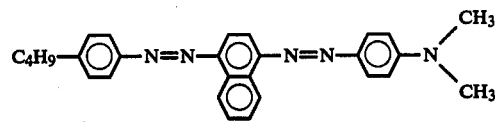

| 1,4-Phenylene derivative: | 0.1 wt. % |

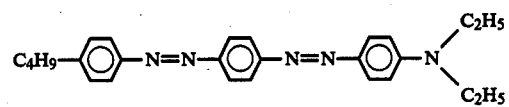

The resulting color liquid crystal display device had a good degree of coloring in red and excellent contrast, clarity and performance stability.

After experiments made with various amounts of the dichroic dyes according to the above Examples 1-9, it was concluded that the suitable amount of the dichroic dyes is 0.4-0.9 wt.%, since with less than 0.4 wt.%, the degree of coloring in red is insufficient, while with more than 0.9 wt.% thereof, the display contrast becomes poor.

What is claimed is:

1. A color display liquid crystal mixture useful in phase transition type negative color liquid crystal display devices comprising a nematic liquid crystal having positive dielectric anisotropy, an optically active substance and from 0.4 to 0.9 wt. % of a dichroic dye mixture comprising 60 to 95 wt % of a dichroic reddish purple diazo dye which is a 1,4-naphthylene derivative of the structural formula:

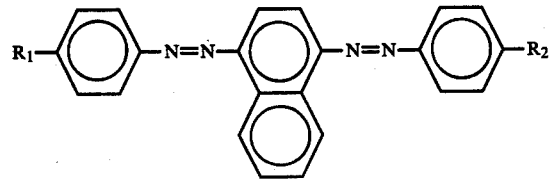

wherein $R_1$ represents an alkyl group containing up to 5 carbon atoms and $R_2$ represents

or

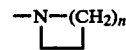

in which R and R′ each represent a lower alkyl group and n represents an integer of at least 4, and 40 to 5 wt % of a dichroic red diazo dye which is a 1,4-phenylene derivative of the structural formula:

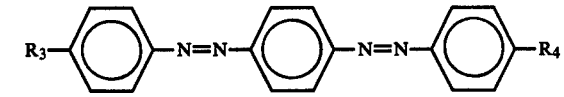

wherein $R_3$ represents an alkyl group containing up to 5 carbon atoms and $R_4$ represents

or

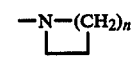

in which R″ and R‴ each represent a lower alkyl group and n represents an integer of at least 4.

2. A color display liquid crystal mixture as in claim 1 wherein the 1,4-naphthalene derivative and 1,4-phenylene derivative are represented by the following formulas:

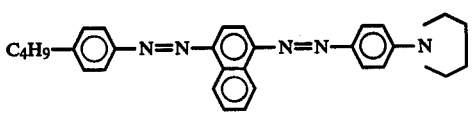

and

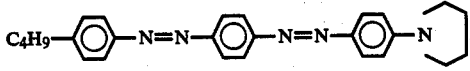

3. A color display liquid crystal mixture as in claim 1 wherein the 1,4-naphthalene derivative and 1,4-phenylene derivative are represented by the following formulas:

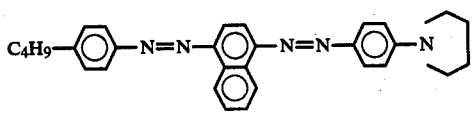

and

-continued
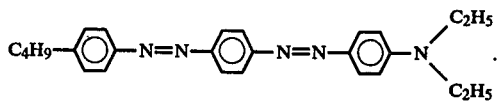
4. A color display liquid crystal mixture as in claim 1 wherein the 1,4-naphthalene derivative and 1,4-phenylene derivative are represented by the following formulas:
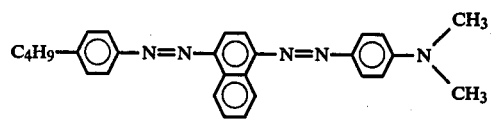
and
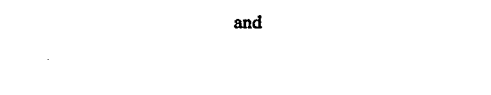
-continued
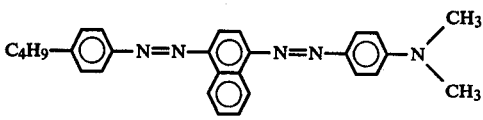
5. A color display liquid crystal mixture as in claim 1 wherein the 1,4-naphthalene derivative and 1,4-phenylene derivative are represented by the following formulas:
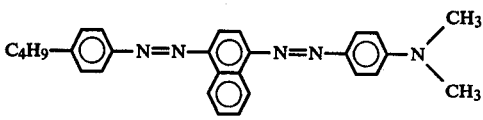
and
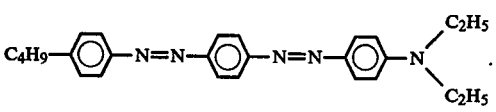
* * * * *